Oct. 19, 1948.　　　D. M. LIEBMANN ET AL　　　2,451,842
CALCULATING INSTRUMENT
Filed Jan. 20, 1945　　　　　　　　　　　2 Sheets-Sheet 1

INVENTORS:-

Oct. 19, 1948.                D. M. LIEBMANN ET AL                2,451,842
                                CALCULATING INSTRUMENT
Filed Jan. 20, 1945
                                                                  2 Sheets-Sheet 2

INVENTORS:-

Patented Oct. 19, 1948

2,451,842

UNITED STATES PATENT OFFICE 2,451,842

CALCULATING INSTRUMENT

Dora Minna Liebmann and Gerhard Liebmann, Cambridge, England

Application January 20, 1945, Serial No. 573,722
In Great Britain February 10, 1944

9 Claims. (Cl. 235—84)

The present invention relates to calculating instruments of the type where a set of fixed scales is arranged on a member and calculations are performed with the help of two cursors movable relatively to each other and relatively to the scales.

The object of the invention is to provide a calculating instrument of the kind referred to which can be operated easily and speedily. Another object of the invention is a calculating instrument which permits, for a given size of instrument and given spacing of the scales, a greater number of different calculating operations than could be performed with the instruments known heretofore.

According to the invention, scales are arranged in fixed relationship to each other on a disk, a cursor (called henceforth the "main cursor") is provided which embraces the said scales, and a second cursor is provided (called henceforth the "auxiliary cursor") which embraces the scales and the first, "main" cursor, both cursors being movable relatively to each other and relatively to the scales, the friction between the main cursor and the scales being greater than the friction between the main cursor and the auxiliary cursor, and the auxiliary cursor having no point of physical contact with the scale carrying member.

Figure 1:
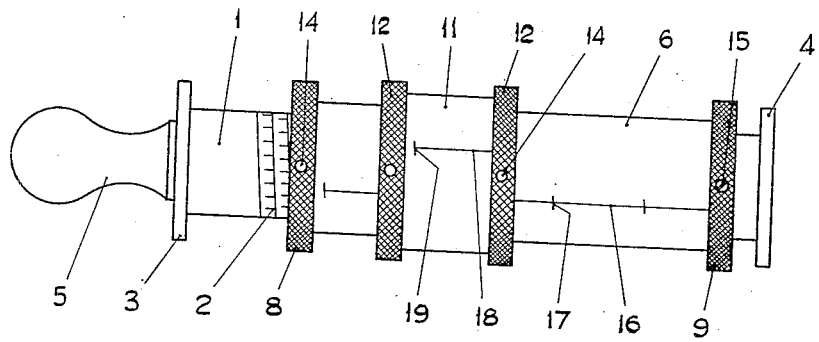
Figure 2:
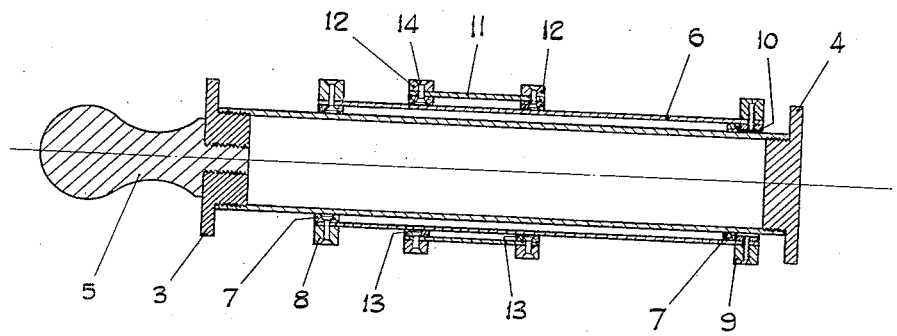
Figure 3:
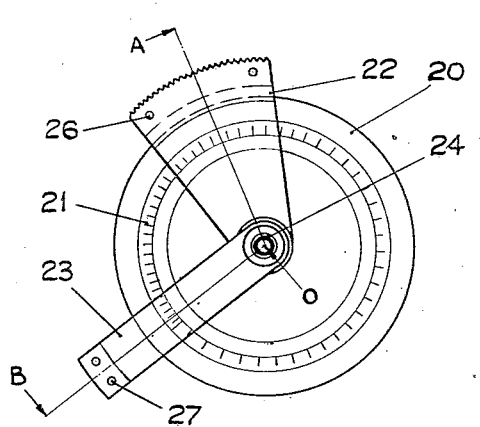
Figure 4:
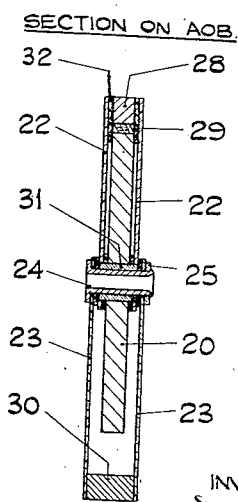
Figure 5:
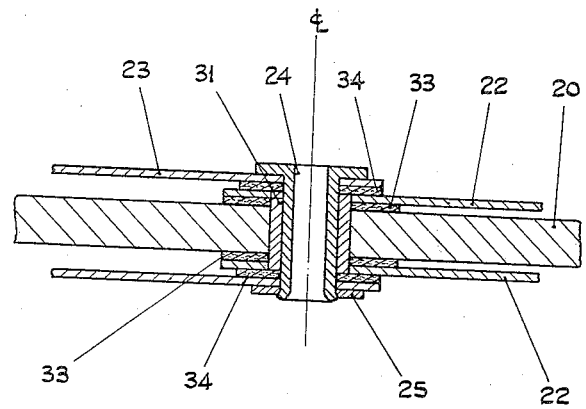
Figure 6:
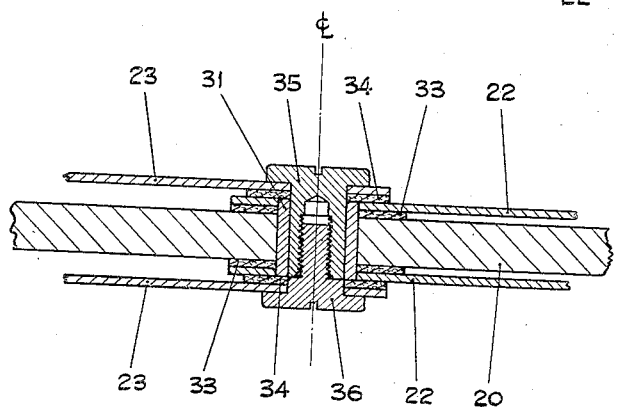
Figure 7:
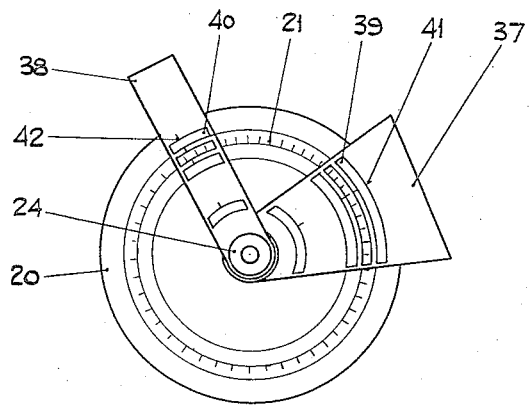

Further details of the invention may be explained best with reference to the accompanying drawings. Figure 1 shows a plan view of an improved calculating instrument in which the scales are arranged on a cylindrical body; Figure 2 shows a section through the same embodiment. Figure 3 is a plan view of the improved calculating instrument; Figure 4 represents a section through the same instrument along the lines A—O—B. In Figure 5 an enlarged view of the centre part of Figure 4 is given, whereas Figure 6 shows a modification of the design of Figure 5. Figure 7 gives a plan view of a disc shaped calculating instrument similar to that of Figure 3, but employing opaque cursors provided with windows.

Referring now to Figures 1 and 2, the numeral 1 denotes a tubular body carrying a set of scales 2 arranged on it. 3 and 4 are flanged endplates screwed into tube 1, the flanges preventing the cursors from leaving the tube 1. A handle 5 is screwed into the endplate 3. The transparent thin walled tube 6 represents the "main cursor," carrying the index line 16 and index marks 17. The tube 6 is kept a short distance (0.004" to 0.008") away from tube 1 by sleeves 7 made from a suitable material, e. g. fabric, which insure a smooth movement of the cursor 6 on the tube 1 with the right amount of friction. The ends of tube 6 are re-inforced by knurled rings 8 and 9, which serve also as handles for the operation of the "main cursor" and prevent the "auxiliary cursor" 11 from leaving tube 6. The ring 8 is permanently secured to the tube 6 by means of eyelets or rivets 14, whereas the other ring 9 is secured to the tube 6 by means of a re-inforcing metal ring 10 and screws 15. The transparent tube 11, the "auxiliary cursor," which need not be thin walled, is kept a short distance away from tube 6, on which it rides, by sleeves 13 which also serve to obtain a smooth movement and the correct amount of friction between tube 6 and tube 11. The ends of tube 11 are re-inforced by knurled or milled rings 12 which are permanently secured to the tube 11 by rivets or eyelets 14. On its inside the tube 11 carries the index line 18 and the index mark 19.

The instrument shown in Figures 1 and 2 can be taken apart, for instance, for cleaning the insides of the cursor tubes 6 and 11, by unscrewing the endplate 4 and detaching the ring 9 by removing the screws 15. The cursor tube 6, measured between the rings 8 and 9, is at least twice as long as the axial extension of one scale plus the width of the two rings 12 and preferably as long as the length taken up by all scales of the set of scales minus the length of one scale, but may be so long that it acts as a protecting sleeve for all the scales 2 arranged on tube 1. The long index line 16 can serve to transfer numerical values from one scale of the set of scales to another one. The length of the cursor tube 11 between the rings 12, by contrast, need only be as long as one single scale.

The operation of the instrument shown in Figures 1 and 2 may be explained by assuming that two members $a$ and $b$ are to be multiplied with the help of a logarithmically subdivided scale representing the numbers from 1 to 10, as known from the common slide rule. The operator holds the instrument by its handle 5 with his left hand and adjusts the cursor tube 6 by a rotating and sliding movement, until the intersection of the index line 16 and the appropriate cross line 17 coincides with the scale marking number "$a$," gripping for this purpose the knurled ring 9 with index and thumb of his right hand. The operator then sets the point of intersection of index marks 18 and 19 on the cursor tube 11 to the value "1" on the scale gripping one of the rings 12. It may sometimes be advisable during this operation for the operator to keep the tube 6 properly adjusted by holding the ring 8 with thumb and index of his left hand. Finally, the operator moves the cursor tube 6 with his right hand until the intersection of index marks 18 and 19 on cursor tube 11 indicates the value "b." The numerical value now indicated by the index mark of the cursor tube 6 is "$a \times b$."

Referring now to Figures 3 to 5, the numeral 20 denotes a circular disc of a suitable material, e. g. metal, plastic material or wood, 21 one of a number of scales arranged concentrically or spirally on both sides of disc 20, the other scales not being shown, 22 the two essentially sector-shaped flat members made from transparent sheet material which constitute part of the main cursor. The two flat members 22 are joined together by the cylindrical bush 31 which can rotate in the center hole of the disk 20, and by the countersunk or recessed eyelets, rivets or screws 26, the distance piece 28 providing the correct spacing and the thin washers 33 and distance pieces 32 preventing the cursor from rubbing on the scales and securing, together with the felt strip 29 fixed to the distance piece 28, the correct amount of friction between "main cursor" and disk. The two flat members 23 forming part of the "auxiliary cursor" are fastened together by the screws or, rivets or eyelets 27 and the bush 24 riveted into the washer 25. The distance piece 30 provides the correct spacing of the parts 23 from each other, and the thin washers 34 made from a suitable material, e. g. felt or Celluloid, secure a smooth movement of the two cursors relatively to each other, the proper amount of friction being adjusted while riveting the bush 24 into the washer 25. The bush 24 forms preferably a sliding fit into bush 31.

Both cursors project beyond the periphery of the disk 20, but the parts 23 of the auxiliary cursor are so long that the inside edge of the distance piece 30 clears the outside edge of the main cursor. The outer edge of the distance piece 28 may be milled to obtain a better grip when operating the instrument. The shapes of cursors shown, one long and comparatively narrow, the other one shorter but wider are preferred as this facilitates the operation of the instrument if it happens that the two cursors have to be set to such positions that they overlap to a greater extent, but other shapes may be found equally suitable. The index lines on the cursors are not shown in Figure 3 as they would coincide with the lines A—O and B—O. The auxiliary cursor may be provided with two index lines on each of the flat parts 23, one on each face of a flat part 23, which two lines are seen in alignment in order to avoid parallactic errors.

Preferably, one or more scales on one side of the disk are co-ordinated with one or more scales on the other side of the disk and are adapted to co-operate in calculating operations. If, by way of illustration, the upper side of the disk is provided with logarithmically subdivided scales for $x$, $x^2$ and $x^3$, and the underside with a scale for $x$, the scales on both sides counting in the same direction, e. g. clockwise, a multiplication by a factor A carried out on the scale for $x$ on the underside of the disk will be equivalent to a division by A, $A^2$ or $A^3$ if the result is read off on one of the scales on the upper side of the disk.

Figure 6 shows a modification of the design just described. In this modification the bush 24 and washer 25 riveting the parts 23 together and securing them movably to the parts 22 are replaced by the flanged stud 35 and shouldered screw 36. The advantage of the embodiment shown in Figure 6 is that the instrument can be taken to pieces more easily, e. g. for cleaning purposes, and that the friction between the two cursors can be adjusted more easily.

Figure 7 shows a plan view of an instrument which is identical with that of Figures 3 to 6, except that the parts 37 and 38 are made from opaque material, for instance metal, and are provided with windows 39 and 40 respectively through which the scales can be read. The index marks 41 and 42 are displaced from the centre lines of the windows by at least the width of the view obstructing window frames.

The two parts 37 of the main cursor may be made from a single piece of material bent in such a way that a section through the cursor perpendicular to their plane surfaces has substantially the shape of a U. The two parts 38 of the auxiliary cursor may likewise be made from a single piece of material folded in a suitable way. The way of constructing the cursors just described by bending a single sheet of material can of course be applied to cursors made from suitable transparent material. It is thus possible to dispense with the separate distance pieces 28 and 30 and the rivets or screws 26 and 27 shown in Figures 3 and 4.

When using a calculating instrument as shown in Figures 3–7, for instance to multiply the number "$a$" with the number "$b$," the operator holds the disc 20 in one hand and adjusts the cursor 22 or 37 respectively by revolving it around the common centre of the disc, scales and cursors until the index mark coincides with the value "$a$." The operator then sets cursor 23 or 38 respectively to the value "1," which may be prominently marked, and re-sets cursor 22 or 37 until cursor 23 or 38 reads "$b$." The value "$a \times b$" is then indicated by the index line of cursor 22 or 37.

The design of the calculating instruments shown in Figures 1–7 may be modified in several ways without leaving the scope of the present invention. The principle of the invention can also be applied to other types of calculating instruments, for instance nomographic calculators.

It will be noticed that the "main cursor" and the "auxiliary cursor" can be made to co-operate, if so desired, with every scale of the instrument, allowing thus a considerably wider range of calculations which can be performed with the help of our improved calculating instrument as compared with instruments of known kinds and of comparable dimensions.

We claim:

1. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk.

2. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, the friction between the disk and the first said cursor being greater than the friction between the first said cursor and the second said cursor.

3. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, the first said cursor being adapted to be detached from said disk.

4. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, the second said cursor being adapted to be detached from the first said cursor.

5. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, the two flat members constituting the first said cursor being thinner than 0.04''.

6. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, at least one of said flat members being made from a transparent material.

7. A calculating instrument comprising a disk shaped members, provided with a center hole, at least one fixed scale arranged on each side of said disk, a cursor constituted by two flat members, one flat member being arranged on either side of said disk, the said two flat members being joined together beyond the perphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, at least one said flat member being made from an opaque material and being provided with at least one window adapted to leave visible any markings of said scale necessary in carrying out calculating operations.

8. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrrying at least one radial index line, the two said cursors being movable relatively to each other and relatively to said disk and being adapted to rotate around a common center and to slide over each other and over said disk, the said second cursor having no point of physical contact with said disk, at least one said flat member being made from an opaque material and being provided with at least one window adapted to leave visible any markings of said scale necessary in carrying out calculating operations, the index line of said opaque flat member being displaced from the center of said window.

9. A calculating instrument comprising a disk shaped member, provided with a center hole, at least one fixed scale arranged on each side of said disk, a cursor constituted by two flat members, one flat member being arranged on either side of said disk, the said two flat members being joined together beyond the periphery of said disk and being joined together by a hollow bush inserted into said center hole and attaching the said cursor to the said disk, a second cursor constituted by two flat members, one flat member being arranged on either side of said first cursor, the said flat members being joined together beyond the outer edge of the said first cursor and being joined together by a journal inserted into the said hollow bush and attaching the said second cursor to the said first cursor, each said flat member carrying at least one radial index line, the two said cursors being movable relatively to each other and relatively to said disk and being adapted to rotate around a common center and to slide over each other and over said disk, the said second cursor having no point of physical contact with said disk, at least one said scale on one side of the said disk being co-ordinated with at least one said scale on the other side of the said disk, the said two co-ordinated scales being adapted to co-operate in calculating operations.

DORA MINNA LIEBMANN.
GERHARD LIEBMANN.

REFERENCES CITED

The following references are of record in the file of this patent:

UNITED STATES PATENTS

| Number | Name | Date |
| --- | --- | --- |
| 843,944 | Hibbard | Feb. 12, 1907 |
| 1,080,811 | Colwell | Dec. 9, 1913 |
| 1,255,939 | Small | Feb. 12, 1918 |
| 1,338,588 | Prescott | Apr. 27, 1920 |
| 1,404,019 | Gilson | Jan. 17, 1922 |
| 1,780,078 | Hite | Oct. 28, 1930 |
| 2,137,630 | Sinitzin-White | Nov. 22, 1938 |
| 2,268,886 | McNamara | Jan. 6, 1942 |